INVENTORS.
MARTIN R. SCHEVE
CHARLES N. YOUNG

United States Patent Office 3,520,734
Patented July 14, 1970

3,520,734
MOST POWERFUL RADIOISOTOPE HEATED THERMOELECTRIC GENERATOR PROVIDING FOR INTACT RE-ENTRY OF THE HEAT SOURCE MEANS FROM SPACE
Martin R. Scheve and Charles N. Young, Baltimore, Md., assignors, by mesne assignments, to the United States of America as represented by the United States Atomic Energy Commission
Continuation-in-part of application Ser. No. 676,933, Oct. 20, 1967. This application Oct. 29, 1968, Ser. No. 771,511
Int. Cl. G05d 23/02; G21h 1/00
U.S. Cl. 136—202           10 Claims

ABSTRACT OF THE DISCLOSURE

Ultra high power, radioisotope heated, thermoelectric generator for use in space comprising a high power density, low ballistic coefficient, radioisotope heat source means for selectively removing excess heat from said heat source means, thermoelectric generator modules for converting a portion of the heat from the heat source means to electrical energy while providing for the removal of waste heat from said modules, and means for remotely inserting and separating the heat source means into and from the housing means for the use thereof in space and for the intact recovery of the heat source means therefrom.

RELATED APLICATIONS

This application is a continuation-in-part of application Ser. No. 676,933; Title: "Low Ballistic Coefficient Radioisotope Heat Source;" Inventor: M. R. Scheve (the coinventor of this application). Filed: Oct. 20, 1967.

BACKGROUND OF THE INVENTION

This invention was made in the course of, or under a contract with the United States Atomic Energy Commission.

In the field of radioisotope powered thermoelectric generators for use in space, a need exists for a housing for high power density radioisotope heat source means. Various means and apparatus have been useful and can accomplish the required housing, such as described and shown in U.S. Pat. 3,296,032 to Belofsky. However, these arrangements have required substantial portions of the housing structure to be burned away to assure release of the radioisotope heat source into the atmosphere. This has required vehicle orientation and/or separation of the isotopes from the vehicle in order to assure sufficient aerodynamic heating. Thus a time lag has often occurred in bringing the housing structure to temperature, and during this interval it has been difficult, if not impossible, to prevent the aerodynamic forces from preventing the desired separation of the radioisotope heat source from the housing from occurring. Moreover, even if separation of the radioisotope heat source did occur, the heat source has often had high ballistic coefficients that have either made intact re-entry difficult or impossible or have made it difficult to limit release into the lower atmospheric regions. Thus high power loadings and/or maximum power densities have not been used heretofore or their use has been severely limited. It has also been advantageous to provide for the selective, rapid and remote loading of the radioisotope heat source means in the housing.

SUMMARY OF THE INVENTION

This invention provides a housing for the high power density heat source means described in the above cited copending application by the co-inventor of this invention. As such, this invention is a continuation-in-part of that copending application. More particularly, this invention provides a thermoelectric generator housing having remotely separable source and excess heat removal means that are held together under compression for the remote assembly and separation of the heat source means without substantially burning the housing before substantial re-entry from space into the earth's atmosphere. Advantageously stainless steel cable means holds the source in a main housing assembly structure and explosive means releases the cable remotely for separation and earth impact of the heat source means. In another aspect, automatic backup means releases the cable quickly and automatically in the event of failure of the explosive means. For selected applications, the heat source means may be held within the main housing assembly structure under deliberately mismatched spring forces whereby the heat source means will be ejected with a tumbling motion. More particularly, in one embodiment, this invention provides a main housing assembly structure having doors that open and close for the remote selective insertion of the heat source means adjacent thermoelectric generator modules and a separable shutter assembly, and cable means for holding the doors closed against the heat source means and shutter assembly under compression for the remote selective separation of the heat source means from the rest of the generator assembly.

The above and further novel features will appear more fully from the following detailed description when the same is read in connection with the accompanying drawings. It is expressly understood, however, that the drawings are not intended as a definition of the invention but are for the purpose of illustration only.

BRIEF DESCRIPTION OF THE DRAWINGS

In the figures where like elements are referenced alike.

DESCRIPTION OF THE PREFERRED EMBODIMENT

It is known that excess thermal energy in a radioisotope heated thermoelectric generator can be suitably controlled by opening and closing shutters selectively to vary the radiation of heat from the radioisotope source to the generator ambient. Such a system is disclosed in U.S. Pat. 3,192,069 to Vogt et al., wherein the shutters are fully opened initially and slowly closed as the radioisotope source decays thereby to maintain a uniform heat input from the source to the thermoelectric generator. This system also has the advantage of preventing the thermoelectric elements from exceeding their maximum operating temperature. The invention hereinafter described employs a shutter system of the type described for controlling the heat input to a radioisotope heated thermoelectric generator. In accordance with this invention, as will be understood in more detail hereinafter, the shutter system is separably attached to a main housing assembly structure for containing the radioisotope source and for providing the remote loading and separation thereof. While the housing of this invention will be described in one embodiment for a particular short operating lifetime, high fuel loading, maximum power density, unmanned mission, it will be understood that this invention is useful for a wide variety of radioisotope fuels, manned and unmanned missions, and short or long operating lifetime missions.

Figure 1:
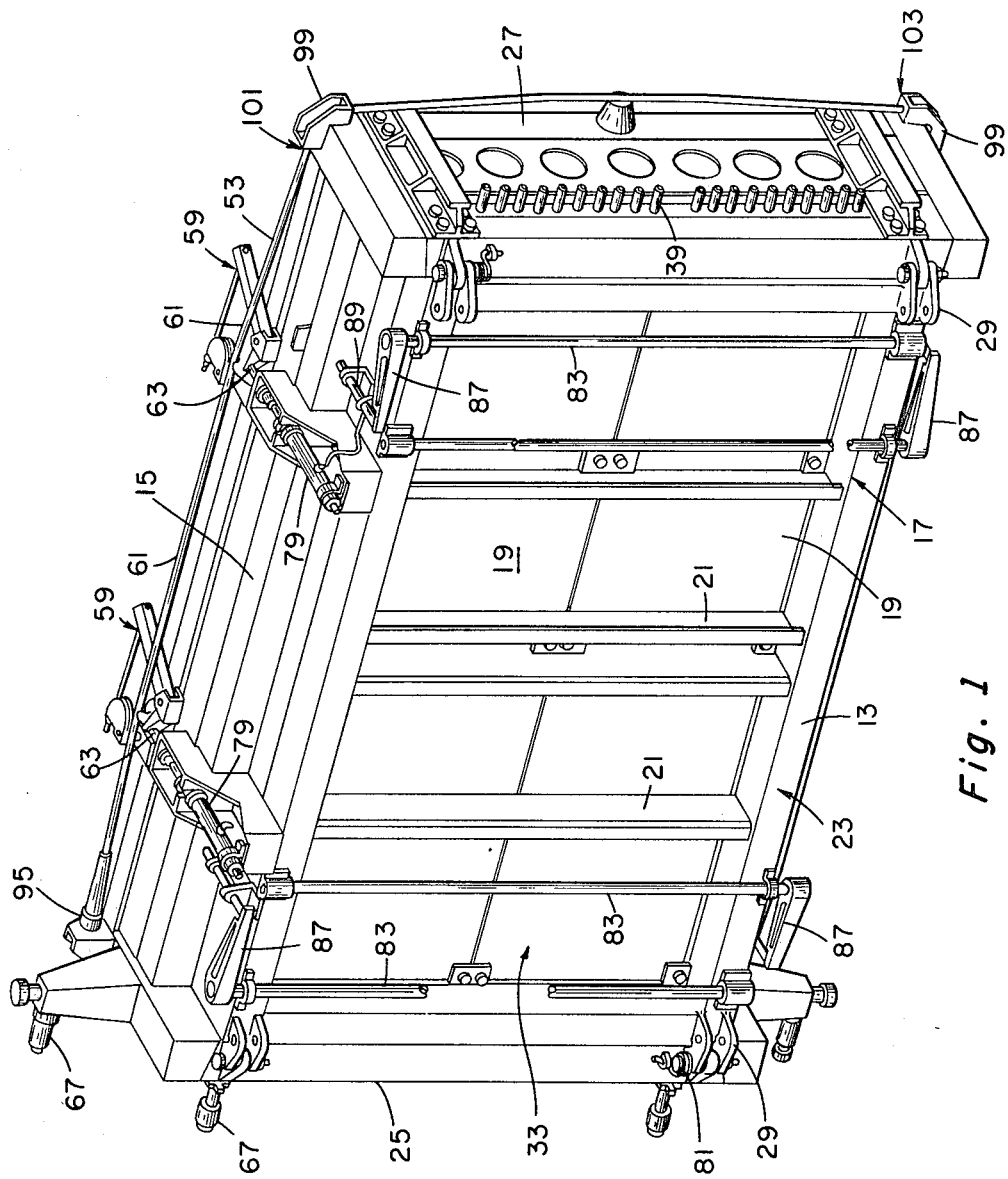
FIG. 1 is a partial three dimensional rear view of the system of this invention.
Figure 2:
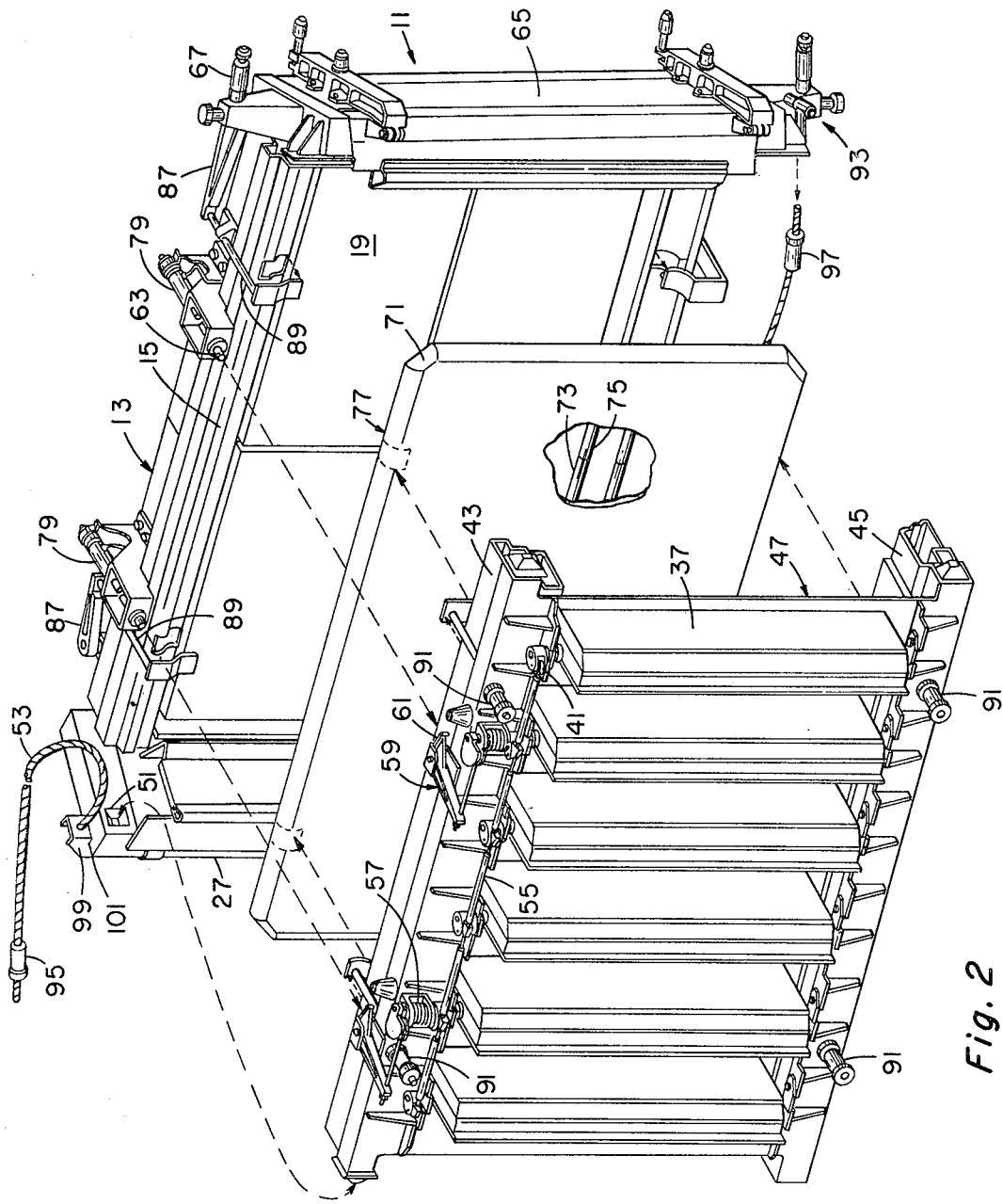
FIG. 2 is a partial three dimensional, exploded, front view of the system of FIG. 1.

Referring to FIGS. 1 and 2, the backbone of the housing 11 of this invention, comprises a rectangular support frame 13 having provision for attachment to a space vehicle structure, not shown for ease of explanation. The top and bottom sections 15 and 17 of the housing 11, which carries thermal insulation, permanently attaches to this frame 13. Thermoelectric modules 19, comprising four modules 19 in the embodiment shown, bolt into this frame 13 with structural stiffeners 21 added to the rear face 23 of the frame 13. The side doors 25 and 27 attach to the frame 13 by means of hinged fittings 29.

The thermoelectric modules 19 are formed with suitable hot plates and cold plates on the inside 31 and outside 33 thereof. The thermoelectric elements are conventional n- and p-type elements in appropriate circuit arrangments having suitable contact pressure with the hot plate and the cold plate which effects efficient heat transfer from radioisotope heat source means 35. A pressurized diaphragm is inserted between the thermoelectric elements and the hot plate to maintain the elements under compression. The hot and cold plates advantageously have suitable high emissivity coatings to help achieve the desired thermal distribution.

The modular approach adds flexibility and versatility whereby the modules 19 provide building blocks in constructing larger or smaller generator systems, in using a variety of different thermoelectric elements, junction hardware, simple electrical flow distribution within each module, in eliminating differential expansion problems, and in simplifying overall fabrication and assembly. Moreover, as will be understood in more detail hereinafter, the housing 11 of this invention provides for the selective remote loading and unloading of the heat source means 35 and excess waste heat removal by shutters 37 and a radiator-heat-pipe 39.

The six shutters 37 pivot in bearings 41 attached to upper and lower beams 43 and 45, as is conventional. The shutter assembly 47 of this invention, however, joins a main housing assembly structure 49, which is adapted to be attached to the space vehicle, by locking the upper and lower beams 43 and 45 into the side doors 25 and 27 by means of specially designed truncated pyramid shaped sockets 51 that prevent rotation of the shutter beams 43 and 45. To this end, side doors 25 and 27 clamp to the shutter beams sockets 51 by means of a stainless steel cable 53 that runs around three sides of the main housing assembly structure 49, thereby to put the shutter beams 43 and 45 in compression.

While the shutter assembly 47 comprises thermal control shutters 37, mechanical linkage 55 connecting the shutters 37 in parallel and springs 57 tending to close the shutters 37, as described in the cited Vogt et al. patent, in accordance with this invention mechanical separable linkage means 59 are provided for opening the shutters 37 against the closing force of springs 57. The first part 61 of this severable linkage means 59 is mounted on parallel beam 43 for supporting the shutters 37 for rotation about parallel axes in shutter assembly 47. The second part 63, is attached to the main housing assembly structure 49. When the housing 11 is assembled, the two parts of linkage means 59 abut so as to operate as an integral unit for opening and closing shutters 37. When the shutter assembly 47 is separated from the main housing assembly structure 49, as described in more detail hereinafter, parts 61 and 63 of this linkage also separate from each other. Thus, by actuating the severable mechanical linkage means 59 back and forth in the main housing assembly structure 49, the shutters 37 selectively open and close to increase and decrease the radiation of heat from heat source means 35 to the ambient air in the launch configuration for flight into space and/or into the space ambient around the space vehicle that is used to propel radioisotope powered thermoelectric modules 19 into space. Thus the excess heat from heat source means 35 is controlled to maintain a uniform heat input from the heat source means 35 to the thermoelectric modules 19.

Also, the shutter assembly 47 can thus be separated for remote separation and intact recovery of the heat source means 35.

Advantageously, the heat source means 35 comprises polonium-210 containing capsules 73 arranged in parallel rows 75, as described in the above cited patent application by the coinventor of this application. The capsules 73, which each comprise one or more high temperature melting metallic structural liners, not shown for ease of explanation, each are closed by welding a high temperature melting metallic plug in the ends thereof. Advantageously, the liner or liners also have a suitable high temperature melting, oxidation resistant, outer metallic clad having a high-emissivity and end plugs welded therein in a helium atmosphere so that the assembly thereof acts as an integral container for operational loads for use in space, re-entry from space, and earth impact. Additionally to this end, a plate shaped, high temperature resistant, graphite fuel block with the fuel capsule embedded in the middle bisecting plane thereof may advantageously be used. However, a thin, flat, metallic honey-comb having outer metallic sandwiched panels forming a plate shaped fuel block having high temperature resistant flat edges confining the rows of fuel capsules in the middle bisecting plane between the sandwich panels, may alternately be used.

This thin, flat plate shaped construction provides the required lightweight low ballistic coefficient for intact recovery of the fuel capsules 73 from space and earth impact by maintaining the fuel capsule containers below their melting temperatures. For example, a 40 pound fuel block of the type described, has a ballistic coefficient of 8.34 and aerodynamic edge heating six times greater than the rest of the fuel block based on a tumbling reentry mode.

Since the described heat source means 35 depends upon radiative heat dissipation during all modes of operation, the described thin, flat, plate-shaped fuel block advantageously has a high surface emissivity. To this end the large flat faces thereof are sandblasted and emissivity coated with suitable coatings, such as are well known in the art. Thus the fuel block provides the required thermal distribution and protective reentry structure.

The low ballistic coefficient and structure of the heat source means 35 meets the thermal and structure requirements for intact reentry. However, for a burn up reentry, the configuration of the heat source means 35 can easily be changed while still in accordance with the selective remote insertion provided by the housing 11 of this invention.

In operation, thermal energy radiates to the thermoelectric modules 19 from the rear face 77 of the heat source means 35. A portion of this energy converts to electricity in modules 19, and the remainder rejects to space through the heat pipe radiator assembly 39, either alone at the end of the mission operating lifetime in the form of waste heat, or in combination therewith through the shutters 37 in the form of excess heat.

The radiator heat pipe assembly 39 is built up in sections, not shown herein for ease of explanation. These sections are bonded to the thermoelectric modules 19 in the main housing assembly structure 49 whereby the heat pipe and radiator structure can wrap around the space vehicle in a manner that allows for differential thermal expansion. One heat pipe assembly is disclosed in application Ser. No. 418,946, filed Dec. 7, 1964, which can be used for circulating cooling fluid from modules 19 to a radiator around the space vehicle. Alternatively, however, a magnetic pump may be used to circulate a liquid metal cooling fluid from the module 19 to a conventional radiator.

Isotopic heat source means 35 inserts into the main housing assembly structure 49 through a separate second door 65 built into the side of first side door 25. Special shielded handling equipment (not shown) for this operation, makes possible the remote insertion and assembly thereof. Suitable guides, such as guides 67, locate the handling equipment, such as is conventional in many remote loadings and unloading operations, for example, for use with flat plate shaped items. However, in accordance with this invention, the heat source means 35 clamps between the side of first doors 25 and 27 in such a way as to prevent horizontal movement in either direction. To this end adjustable wedges 69 at the top and bottom corners 71 on the right side of the heat source means 35 prevent vertical motion for completing the launch configuration of the housing 11.

The polonium heat source means 35 has a particularly short radioactive half-life, and, therefore, the thermal energy available varies considerably over a particular mission operating lifetime. In order to maintain the inside 31, i.e., the hotside of the thermoelectric modules 19 at a constant temperature, a NaK (sodium-potassium) reservoir is constructed as an integral part of the thermoelectric modules 19 for actuating shutters 37 of shutter assembly 47. The volume of the NaK changes as a function of temperature and pressure. The pressure variation, which is small, is caused by small changes in the shutter return spring forces provided in shutter assembly 47 by springs 57. The expansion of the NaK as a function of temperature in modules 19 actuates a bellows assembly 79 mounted on the top section 15 of the main housing structure 49, whereby that structure may be fixed to the space vehicle. As the NaK expands to extend the bellows structure 79, the shutters 37 return to their closed position by means of the return spring forces stored by springs 57 that are transferred to all the shutters 37 by the linkage 55. Thus the shutters 37 open and close to control the temperature of the heat source means 35 and thus the temperature of thermoelectric modules 19 by dumping the excess thermal energy to the ambient around the shutter assembly 47, while also providing for the remote separation of the shutter assembly from the main housing structure 49 and the heat source means 35.

Upon re-entry or deactivation of the mission, the heat source means 35 separates from the main housing assembly structure 49. This is advantageously accomplished on command from earth alone or in combination with the sensing of initial aerodynamic heating before substantial re-entry, or by any other suitable means or combination thereof, where for example one system can serve as a backup system for the other. In any event, the release is initiated by separating the force provided by cable 53 that holds the side doors 25 and 27 closed to the shutter beams 43 and 45. Once the cable 53 separates, the side doors 25 and 27 pivot away from the shutter assembly 47 by means of springs 81 incorporated in the hinged fittings 29 on the rear of frame 13.

The heat source means 35 and shutter assembly 47 are pushed away from the main housing assembly structure 49 by a spring force to assure positive separation. To this end springs rods 83 rotate on the rear face 23 of frame 13, which corresponds to the outside 33 of modules 19, to push arms 87 against plungers 89 mounted on top and bottom sections 15 and 17 of the main housing assembly structure 49. Additionally, mechanical energy stored in springs 91 mounted in the top and bottom shutter beams 43 and 45 releases relatively to separate the shutter assembly 47 from the heat source means 35.

When the main housing assembly structure 49 is assembled with shutter assembly 47 and heat source means 35 is inserted therebetween to provide the launch configuration in housing 11, shutter assembly ejection springs 91, like heat source ejection spring rods 83, are all under compression. Thus when cable 53 is released to release springs 81 to open doors 25 and 27, springs 91 and spring rods 83 separate the shutter assembly 47 and heat source means 35 from each other and from the main house assembly structure 49.

Advantageously, it is desirable to impart a tumbling motion to the heat source means 35 by mismatching the four spring rods 83. Alternately, to this end, however, these spring rods 83 and springs 91 can be mismatched, with the shutter assembly 47 being separated from the heat source means 35 in all cases by a smaller spring force than the force of the spring rods 83 that separate the heat source means 35 and shutter assembly 47 from the main housing assembly structure 49.

Advantageously, an explosive coupling 93 releases the cable 53. To this end the coupling 93 is exploded on command by a ground radio controlled electric power supply and radio receiver connected to housing 11 and energized by modules 19, although other suitable alternatives such as a thermally energized switch may be used. This coupling 93 thus provides the primary cable releasing means. In the embodiment shown, the cable 53 is fixed at the end 95 to door 25. The cable runs along three sides of the main housing assembly structure 49, and provides for the connection of end 97 of cable 53 through coupling 93 to the door 25 to hold both side door 25 and 27 closed against shutter assembly 47 under compression. This system can thus be actuated by remote earth command, remote crew command in a manned space vehicle, and/or by thermal sensors placed around the periphery of the vehicle structure to eject the heat source means before substantial re-entry therefor from space into the earth's atmosphere. This system thus significantly, does not require vehicle orientation for the ejection and intact re-entry of heat source means 35. Also, safety lock-outs are easily provided for ground and launch operations in any of these modes of operation.

For additional assurance of release of cable 53 in case of an explosive failure of coupling 93, small, low melting temperature, aluminum, cable connector means, such as fittings 99, at two opposite corners 101 and 103 of door 27, melt by aerodynamic heating before substantial re-entry of heat source means 35 from space into the earth's atmosphere. In case the cable 53 is not released by the explosive coupling 93, connector means 99 provides the same by burning away to release the cable 53 from doors 25 and 27 whereby springs 81 open doors 25 and 27 and springs 91 and spring rods 83 release their stored energy to separate the heat source means 35 and shutter assembly 47 from each other and from the main housing structure 49.

This invention has the advantage of providing a simple, reliable and effective system for separating a radioisotope heat source means from a thermoelectric generator assembly. Moreover, the system of this invention provides for the remote assembly and separation of the heat source means. Additionally, this invention provides for the intact recovery of the heat source means from space into the earth's atmosphere and the containment of radioactive fuel therein upon earth impact.

What is claimed is:

1. Separable, radioisotope heated, thermoelectric generator assembly housing (11) for use with a space vehicle comprising:

(a) rectangular, box-shaped, main housing assembly means (49) having support frame means (13), thermoelectric power producing modules (19) in said frame means (13), longitudinally extending top and bottom sections (15 and 17) for said frame means (13), first door means (25 and 27) hinged to said frame means (13) to pivot at an angle to the ends of said top and bottom sections (15 and 17) selectively to form therewith an open ended box that is closed at one end by said support frame (13) and modules (19) therein, second door means (65) in one of said first door means (25), and means (39) for removing waste heat from the outside (33) of said modules (19);

(b) low ballistic coefficient radioisotope heat source means (35) selectively insertable into said box by opening and closing said second door means (65) for heating the inside (31) of said modules (19) in said box to provide with said means (39) for removing waste heat a power producing heat gradient from said inside (31) to said outside (33) of said modules (19);

(c) separable shutter assembly means (47) for selectively closing and opening the open end of said main housing assembly means (49) to maintain a uniform heat input from said radioisotope heat source means (35) to said inside (31) of said modules (19) by selectively dumping excess heat from said radioisotope heat source means (35) through said shutter assembly means (47);

(d) holding means (53) for selectively producing a force against said shutter assembly means (47) and first door means (25 and 27) tending to hold said first door means (25 and 27) closed against said shutter assembly means (47);

(e) release means (93) for selectively, remotely, releasing said force; and (f) separation means (83 and 91) responsive to the release of said force for automatically causing said shutter assembly means (47), radioisotope heat source means (35), and main housing assembly structure means (49) to separate relatively apart for the separate, intact, re-entry of said heat source means (35) into the earth's atmosphere from space and the subsequent earth impact thereof.

2. The invention of claim 1 in which said first door means (25 and 27) form depressed sockets (51) having the shape of the truncated pyramids, and said shutter assembly means (47) mates with said sockets (51) to prevent relative rotation thereof.

3. The invention of claim 1 in which said holding means (53) comprises a cable that runs around three sides of said main housing assembly means (49) to hold said first door means (25 and 27) against said shutter assembly means (47) under compression.

4. The invention of claim 1 in which said release means (93) comprises an explosive element for selectively releasing said holding means (53), and back up means (99) forming severable connectors for cable (53) at corners (101 and 103) of one of said doors (27) that burn away upon re-entry of said main housing assembly means (49) into the earth's atmosphere, and said holding means (53) comprises a cable assembly that runs around three sides of said main housing assembly means (49) and is connected to said back-up means (99) whereby said burning away thereof releases said cable (53) to release said force against said shutter assembly means (47) and first door means (25 and 27) in case of failure of said explosive element of said release means (93).

5. The invention of claim 1 in which said release means (93), comprises an explosive element that selectively releases said force against said shutter assembly means (47) and first door means (25 and 27), and cable connector backup means (99) that burns away upon re-entry of said main housing assembly means (49) into the earth's atmosphere to release said force in case of failure of said explosive element.

6. The invention of claim 1 in which said radioisotope heat source means (35) has a flat modular configuration having a low ballistic coefficient for intact re-entry into the earth's atmosphere from space and selective insertion between said shutter assembly means (47) and modules (19).

7. The invention of claim 1 in which said support frame means (13) has a radiator-heat-pipe assembly means (39) for circulating fluid past one side of said modules (19) whereby said shutter assembly means (47) can operate on the other side of said heat source means (35).

8. The invention of claim 1 having means (79) for actuating said shutter assembly means (47) as a function of the inside temperature of said modules (19) for producing an opening and closing second force for said shutter assembly means (47), and said shutter assembly means (47) has a linkage (59) separably responsive to said opening and closing second force for actuating said shutter assembly means (47) to maintain a uniform temperature on said inside of said modules (19) adjacent to said radioisotope means (35).

9. The invention of claim 1 in which one of said first doors (25) has an additional door (65) for inserting therethrough a radioisotope heat source means (35), comprising a polonium heat source embedded in a protective structure having opposite flat surfaces, and high-temperature resistant edges, forming a plate-shapped, separable, low ballistic coefficient, package for intact re-entry and earth impact from space for selectively inserting said heat source means (35) in said housing assembly means (11) when said first door means (25 and 27) are closed.

10. Separable radioisotope heated thermoelectric generator assembly housing (11) for use with a space vehicle, comprising:

(a) radioisotope heat source means (35);

(b) main housing assembly structure means (49) having thermoelectric generator modules (19) for converting heat from said heat source means (35) to electricity, and cable means (53) for holding said heat source means (35) and main housing assembly structure means (49) together in an assembly under compression to produce said electricity for use in said space vehicle; and (c) means (93) for remotely quickly releasing said cable (53) for quickly remotely and automatically releasing said compression for separating said heat source means (35) and main housing assembly structure means (49) from each other for the re-entry from space into the earth's atmosphere and the intact earth impact of said heat source means (35).

References Cited

UNITED STATES PATENTS

| 3,192,069 | 6/1965 | Vogt et al. | 136—202 |
| 3,296,032 | 1/1967 | Belofsky | 136—202 |

CARL D. QUARFORTH, Primary Examiner

H. E. BEHREND, Assistant Examiner

U.S. Cl. X.R.

136—230; 165—32, 96